United States Patent [19]

Shimura et al.

[11] Patent Number: 4,816,158

[45] Date of Patent: Mar. 28, 1989

[54] METHOD FOR TREATING WASTE WATER FROM A CATALYTIC CRACKING UNIT

[75] Inventors: Shiro Shimura, Saitama; Toshio Iwase, Kanagawa; Munetaka Sato, Kanagawa; Saburo Ozawa, Kanagawa, all of Japan

[73] Assignee: Niigata Engineering Co., Ltd., Tokyo, Japan

[21] Appl. No.: 27,475

[22] Filed: Mar. 18, 1987

[30] Foreign Application Priority Data

Mar. 18, 1986 [JP] Japan .................................. 61-60134

[51] Int. Cl.⁴ ............................................. C02F 3/34
[52] U.S. Cl. ..................................... 210/610; 210/611; 210/614; 210/626; 210/630; 210/631; 210/903; 210/909
[58] Field of Search ............... 210/612, 614, 626, 631, 210/606, 610, 611, 629, 630, 903, 916, 909

[56] References Cited

U.S. PATENT DOCUMENTS

| | | | |
|---|---|---|---|
| 3,870,599 | 3/1975 | Azarowicz | 210/611 X |
| 3,979,283 | 9/1976 | Prudsm | 210/611 |
| 4,132,639 | 1/1979 | Katz et al. | 210/705 |
| 4,172,781 | 10/1979 | Walk et al. | 210/626 |
| 4,179,365 | 12/1979 | Sumi | 210/626 X |
| 4,239,620 | 12/1980 | Doll et al. | 210/601 |
| 4,334,026 | 6/1982 | Chynoweth et al. | 210/610 X |
| 4,385,121 | 5/1983 | Knowlton | 210/610 X |
| 4,393,166 | 7/1983 | Reischl et al. | 210/631 X |
| 4,493,895 | 1/1985 | Colaruotolo et al. | 210/610 X |
| 4,537,682 | 8/1985 | Wong-Chong | 210/626 X |

Primary Examiner—Tom Wyse
Attorney, Agent, or Firm—Sughrue, Mion, Zinn, Macpeak and Seas

[57] ABSTRACT

A method for treating waste water from a catalytic petroleum cracking unit is disclosed. The method includes receiving step, aeration step, settling step, and a discharging step. In the receiving step waste water from which hydrogen sulfide and ammonium have been stripped out is introduced into a biological treatment tank. In the aeration step, the waste water in the tank is subjected to aeration for a predetermined period of time. In the settling step, activated sludge within the biological treatment tank is settled for a predetermined period of time. And in the discharging step, the supernatant is discharged from the tank subsequent to the settling step.

The total duration of the aeration step performed daily is set to no longer than 12 hours and the aeration step is performed intermittently. If these conditions are met, yeasts which form pseudohyphae will grow actively enough to facilitate settling and separation of activated sludge. In addition, treatment of an undiluted waste water, which has been impossible with the conventional process of continuous activated sludge treatment, cna be realized by the method of the present invention and not only does this allow the waste water to be treated consistently without deteriorating the quality of effluent but also the amount of excess sludge occurring is sufficiently reduced to lower the load of sludge treatment.

30 Claims, 12 Drawing Sheets

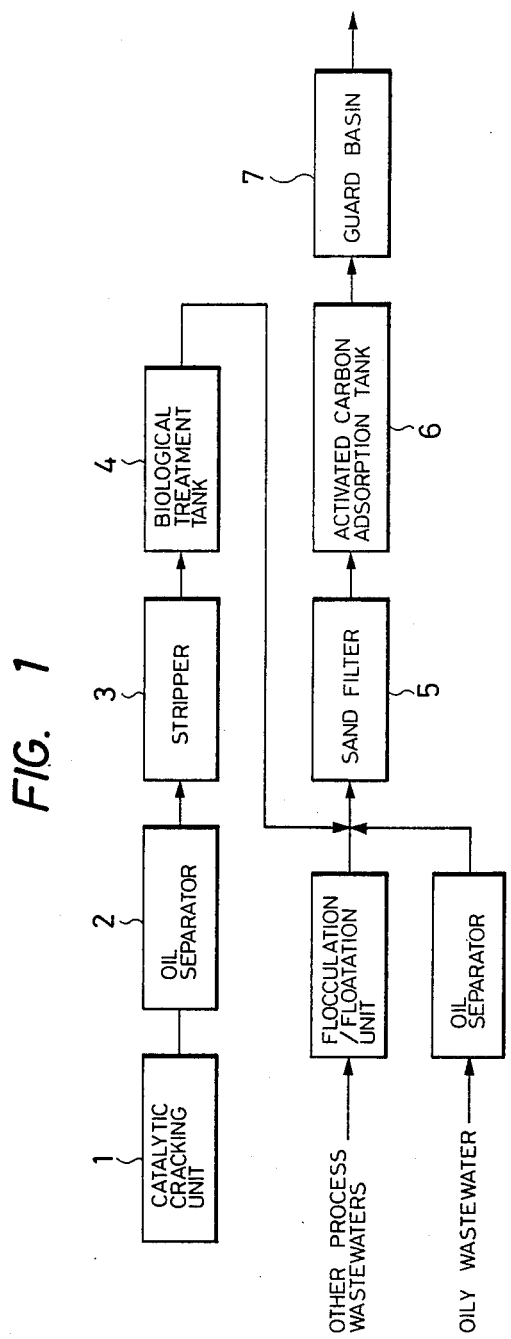

FIG. 2(a)

| STEP \ TIME | 0 | 6 | 12 | 18 | 24 |
|---|---|---|---|---|---|
| RECEIVING | ▨▨▨▨▨▨▨▨▨▨▨▨ | | | | |
| AERATION | | | ▨▨▨▨▨▨▨▨▨▨▨▨ | | |
| SETTLING | | | | | ▨▨ |
| DISCHARGING | | | | | ▨ |

FIG. 2(b)

| STEP \ TIME | 0 | 6 | 12 | 18 | 24 |
|---|---|---|---|---|---|
| RECEIVING | ▨▨▨▨▨ | | ▨▨▨▨▨ | | |
| AERATION | | ▨▨▨▨▨ | | ▨▨▨▨▨ | |
| SETTLING | | | ▨▨ | | ▨▨ |
| DISCHARGING | | | ▨ | | ▨ |

FIG. 2(c)

| STEP \ TIME | 0 | 6 | 12 | 18 | 24 |
|---|---|---|---|---|---|
| RECEIVING | ▨▨▨ | ▨▨▨ | | ▨▨▨ | |
| AERATION | ▨▨▨ | | ▨▨▨ | | ▨▨▨ |
| SETTLING | | ▨▨ | | ▨▨ | ▨▨ |
| DISCHARGING | | ▨ | | ▨ | ▨ |

METHOD FOR TREATING WASTE WATER FROM A CATALYTIC CRACKING UNIT

BACKGROUND OF THE INVENTION

The present invention relates to a method for treating waste water discharged from catalytic cracking units at an oil refinery.

Catalytic cracking is chiefly performed to produce gasoline of an increased octane number by cracking, in the presence of a catalyst, those fractions which have higher boiling points than kerosene. Catalytic cracking of petroleum has conventionally been achieved with various types of reactors, including a fluidized-bed unit, a moving-bed unit, and a fixed-bed unit. Recently, techniques have been developed either an atmospheric or vacuum residual oil be mixed in the feed to the catalytic cracking unit.

In the operation of a catalytic cracking unit as described in *Direction for Industrial Waste Processing Technique*, published by Public Pollution Safety Board of Japanese Ministry of International Trade and Industry in March, 1973, steam is injected at various sites within the unit in order to achieve such objects as preventing carbonization, assisting in oil-catalyst separation, dispersing the catalyst, and achieving oil stripping from the catalyst. The steam fed emerges from the top of a reactor together with the decomposition product. The decomposition product is subjected to purification in a fractionating tower and a stripper, which are also fed with stripping steam in order to achieve enhanced fractionation. All of the steam came to the top of the fractionating tower together with light oils, and is cooled, and separated from the light oils in a condenser, and is discharged from the system as waste water. The principal components of the waste water from the catalytic cracking unit are shown in Table 1, from which one will be be able to see that it contains large amounts of ammonia, hydrogen sulfide and phenols, as well as having a high COD (chemical oxygen demand). Therefore, of all the waste waters originating from an oil refinery, the one discharged from a catalytic cracking unit is most refractory to efficient treatment.

TABLE 1

| pH | 8–9.5 |
| --- | --- |
| oils | 1–10 ppm |
| NH$_4$ | 1,000–7,000 ppm |
| S$^{2-}$ | 100–1,000 ppm |
| phenols* | 10–1,000 ppm |
| COD | 300–2,700 ppm |
| CN$^-$ | 20–60 ppm |

*Phenols including phenol, o-, m-, p-cresol, etc.

As described at pages 58–63 in *Circumstance Creation, Activated Carbon Treatment for Waste Water from Petroleum Refinery or Petro-Chemical Factory*, published in 1975, the conventional method for treating waste water discharged from a catalytic cracking unit generally proceeds as follows: hydrogen sulfide and ammonia are first stripped out of the waste water, which is then passed through a crude oil desalting unit or a phenol extracting unit to extract part of the phenols; subsequently the waste water is diluted with other process waste waters or industrial water; the diluted waste water is treated by the continuous activated sludge process at a pH in the neutral range; finally, in order to meet standards of the emissions of COD and phenols, the activated sludge treated waste water is subjected to treatment with activated carbon.

The waste water to be treated by the aforementioned method contains phenols, hydrogen sulfide, and other substances that are harmful to microorganisms. In particular, phenols cannot be removed satisfactorily even by extraction with crude oil or other solvents. Therefore, sludge bulking will readily occur during continuous activated sludge treatment of the undiluted or slightly diluted waste water. In operation of the activated-sludge plant, utmost care should be exercised to hold the sludge volume index (SVI) at no greater than 100 ml/g. The reason therefor is that should sludge bulking occur to cause an increase in the SVI, further treatment of the waste water would become impossible. In addition, municipal governments have set fairly strict emission standards regulating COD and phenol levels in waste waters from an oil refinery.

In order to meet these conditions, commercial catalytic cracking units operating today employ combinations of activated sludge treatment of highly diluted waste water and subsequent treatment with activated carbon. Therefore, efficient treatment of waste water from a catalytic cracking unit requires contaminants such as COD and phenols to be sufficiently removed in the step of activated sludge treatment so as to minimize the loading of contaminants for the subsequent step of treatment with activated carbon.

The above described SVI, which is also referred to as "Mohlman Index", is represented by:

$$SVI = \frac{\text{settling rate of activated sludge (\%)}}{\text{activated sludge concentration (\%)}}\text{ (in 30 minutes)}$$

More specifically, SVI is defined as the volume in milliliters occupied by one gram of sludge in a mixed-liquor sample (taken at the outlet of the aeration tank) after settling for 30 min in a 1000-ml graduated cylinder.

Throughout this specification, "catalytic petroleum cracking unit" implies an apparatus for decomposing hydrocarbons such as petroleum having a boiling point higher than that of kerosene and aromatic compounds using a catalyst.

SUMMARY OF THE INVENTION

In accordance with the present invention, the aforementioned problems are solved by a method for treating waste water from a catalytic petroleum cracking unit, which comprises a receiving step for supplying a biological treatment tank with waste water from which hydrogen sulfide and ammonia have been stripped out; an aeration step for intermittently aerating said waste water in said biological treatment tank for a predetermined period of time; a settling step for allowing the activated sludge within said biological treatment tank to settle for a predetermined period of time; and a discharging step for allowing the supernatant to be discharged from said biological treatment tank subsequent to the settling step; and the total duration of the aeration step performed daily is not longer than 12 hours.

In the method of the present invention, the total duration of the aeration step performed daily is set to no longer than 12 hours and the aeration step is performed intermittently. If these conditions are met, yeasts which form pseudohyphae will grow actively enough to facilitate settling and separation of activated sludge. In addition, treatment of an undiluted waste water, which has been impossible with the conventional process of continuous activated sludge treatment, can be realized by the method of the present invention, and not only does this allow the waste water to be treated consistently without deteriorating the quality of effluent, but also the amount of excess sludge occurring is sufficiently reduced to lower the load of sludge treatment.

BRIEF DESCRIPTION OF THE DRAWINGS

In the drawings;

FIG. 1 is a flowchart of the treatment of waste water;

FIGS. 2 (a) to (c) show three examples of schedules for operating the individual steps of activated sludge process on a batch system;

DETAILED DESCRIPTION OF THE PREFERRED EMBODIMENTS

Figure 3:
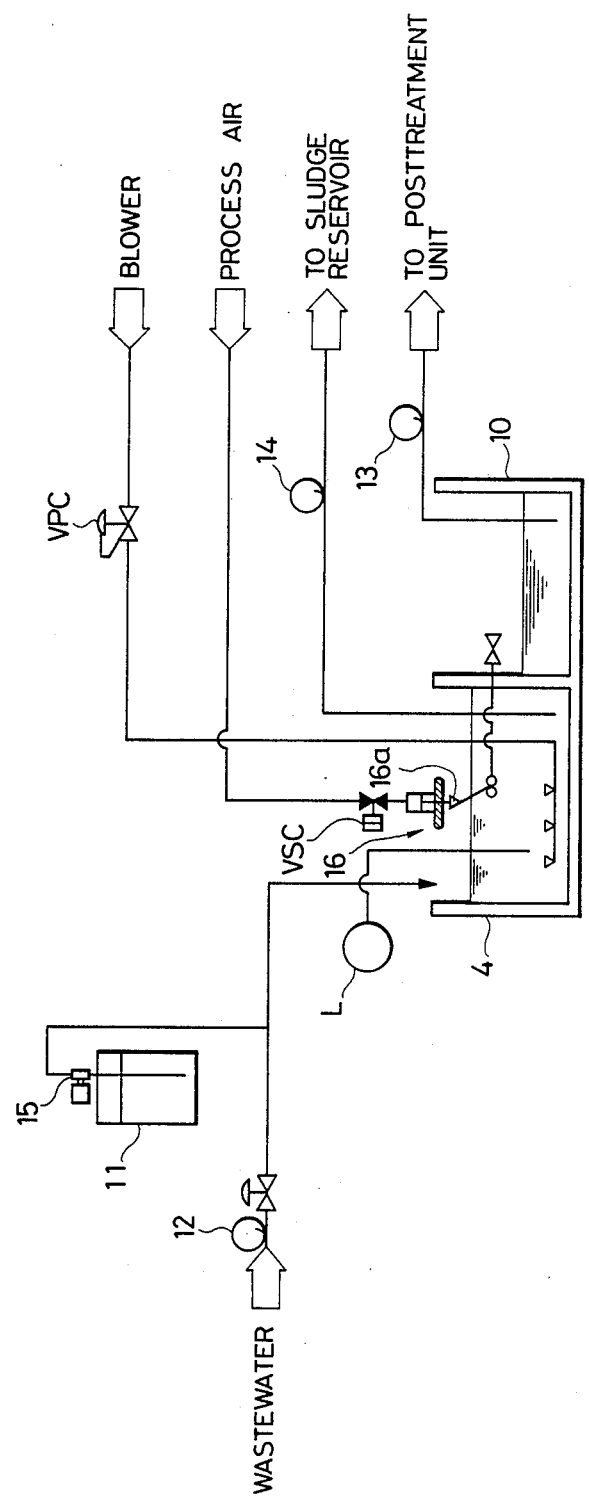
FIG. 3 is a schematic of the receiving step in a batch-operated activated sludge process.

An embodiment of the method of the present invention is hereinafter described with reference to the accompanying drawings.

FIG. 1 is a flowchart of the process for treating waste water from a fluidized-bed catalytic cracking unit 1. As shown, the waste water from the catalytic cracking unit 1 is first sent to an oil separator (waste water surge tank) 2 where it is retained for a period of about 6 to 24 hours to reduce the oil content to a level of approximately 5 to 10 ppm. Subsequently, the waste water is sent to a stripper 3 where hydrogen sulfide and ammonia are stripped out to such that the levels of the sulfide ion and the ammonium ion are not more than 10 ppm and 150 ppm respectively. Thereafter, the waste water is fed to a biological treatment tank 4 for performing activated sludge treatment in a batch system. The supernatant, or the waste water which has passed through the activated sludge treatment, may optionally be fed through a sand filter 5, an activated carbon adsorption tank 6, and a guard basin 7 together with other process waste waters and oily waste water, and the resulting effluent is discharged into watercourses.

An embodiment of the process of stripping to be effected in the stripper 3 is hereunder described more specifically. The waste water from the oil separator 2 is pressurized to 6 to 7 kg/cm$^2$G (gauge) with a pump, heated to 90° to 95° C. with a feed bottom heat exchanger, and fed into a top portion of the stripper 3. Steam is introduced to the bottom of the stripper so as to strip out ammonia and hydrogen sulfide at ca. 120° C., which are recovered overhead from the stripper. The treated water which is free of ammonia and hydrogen sulfide is withdrawn from the bottom of the stripper, fed to a feed bottom heat exchanger for achieving heat exchange with the raw waste water, and subsequently cooled with a cooler to a temperature of about 30° to 50° C.

The waste water that has been freed of ammonia and hydrogen sulfide in the stripper 3 is stored temporarily in a reservoir tank (not shown) before it is fed to the biological treatment tank 4 where it receives activated sludge treatment on a batch system, during which time treatment aeration is performed intermittently, with the total duration of aeration achieved daily not exceeding 12 hours. This permits the waste water to be directly sent to the biological treatment tank 4 without being passed through an extraction unit or crude oil desalting unit as in the conventional process. As a further advantage, the waste water does not need to be diluted with other waters or the like as in the prior art. In the conventional method of continuous activated sludge treatment, yeasts which coexist with microorganisms such as zoogloea that commonly occur in the micro-flora in activated sludge grow in a unicellular form and will settle very poorly. However, if activated sludge treatment is performed on a batch system in the manner specified by the present invention, coexisting pseudohypha-forming yeasts produce an active growth of pseudohyphae which contributes to the formation of coarse flocs. As a result, the sludge has an SVI of from 400 to 600 ml/g and settles quickly enough to ensure easy separation from the waste water.

The treatment of waste water in tank 4 with activated sludge on a batch system is described hereinafter in greater detail. The process consists of a combination of the following steps: a receiving step for supplying the waste water into the biological treatment tank 4, an aeration step for aerating the influent waste water in tank 4 for a predetermined period of time, a settling step for allowing the activated sludge to settle by retaining the aerated waste water for a predetermined period of time, and a discharging step for allowing the supernatant of waste water to be discharged from the tank 4. The individual steps may be combined in various patterns on a time basis.

Microscopic observation shows that when treatment by the activated sludge process on a batch system is performed with a total duration of aeration being set to within 12 hours, pseudohypha-forming yeasts produce actively growing pseudohyphae in the biological treatment tank 4. However, no formation of pseudohyphae occurs if the duration of aeration is extended beyond 12 hours, and substantially unicellular yeasts are observed. This leads to the conclusion that the maximum allowable duration of aeration which ensures sufficient growth of pseudohyphae from yeasts to increase the settleability of activated sludge and to facilitate its separation is 12 hours. The present inventors also investigated the relationship between the efficiency of phenol removal and the duration of one cycle of aeration; as a result, it was found that 90% phenol removal or better was attainable when one cycle of aeration lasted for 3 hours or more but that the efficiency of phenol removal dropped markedly when the duration of one cycle of aeration was shorter than 3 hours. It is therefore concluded that the duration of one cycle of aeration is preferably at least 3 hours.

Microorganisms may be acclimatized by any of the acclimation methods commonly employed in activated sludge treatment. An exemplary method proceeds as follows: excess sludge from nearby activated-sludge-treatment plants such as sewage treatment plants or night-soil-treatment plants is charged into the biological treatment tank 4 in such an amount that a mixed liquor produced when a planned quantity of waste water is fed into the tank 4 will have a mixed liquor suspended solids (MLSS) concentration of about 2,000 ppm. Then, 30% of the designed quantity of the waste water that has been treated in the stripper 3 is supplied to the tank 4 under the same conditions as used in field operation. Operation is continued for a period of several days, during which the load, or the volume of waste water being supplied, is progressively increased through 50%, and up to 70% of the designed value. The duration of operation to be conducted for each load should be determined by the operator after he has confirmed that the quality of the waste water being treated has become stable. As a guide figure, he may adopt a 5-day period.

In the embodiment under discussion, the efficiency of removal of nitrogenous components is improved by suspending the supply of air during initial start-up period of the receiving step so that the interior of the biological treatment tank 4 is held anaerobic add by commencing the aeration step sometime after the step of receiving waste water has started. This may be accomplished as follows: at the time when about one half the supply of waste water has flowed into the tank 4, air supply is started to aerate the inside of that tank. By the process described herein, nitrification-denitrification is promoted.

When a predetermined time for aeration has elapsed, the supply of air is stopped to start the settling step for separating the waste water from the activated sludge. After settling for a predetermined period, the process shifts to the discharging step, in which the supernatant is discharged into an effluent tank as the treated water while excess sludge that has grown during treatment is extracted with a sludge pump into a sludge reservoir (not shown) as the supernatant is discharged. The treated water in the effluent tank may optionally be sent to a sand filter 5 and even to an activated carbon adsorption tank 6 with an effluent pump so as to remove any trace amounts of residual phenol from the water by adsorption.

The number of cycles of treatment achieved by the process of the present invention per day may be one, as is shown in FIG. 2(a), or two (FIG. 2(b)) or three (FIG. 2(c)). An even larger number of cycles may, of course, be used if desired. Treatment on the basis of multiple cycles is preferable, since a smaller capacity is required for the biological treatment tank 4 or for the reservoir where the waste water is temporarily retained before being supplied to that tank.

The individual steps for operating the activated sludge process on a batch system in the aforementioned manner are hereunder described in greater detail with reference to FIGS. 3 to 6, wherein 10 is an effluent tank, 11 is a tank for holding a pH adjusting agent, 12 is a raw water pump, 13 is an effluent pump, 14 is a sludge pump, 15 is a pump for feeding a metered volume of pH adjusting agent, 16 is a water collector, 16a is a water intake port that is installed in a vertically displaceable manner by means of a swivel joint on the water collector 16 and which is movable either upwardly or downwardly with an air cylinder; VSC is a valve; VPC is a pressure control valve, and L is a level indicator. In each of FIGS. 3 to 6, VSC is "open" if not shaded and is "closed" if it is shaded.

(1) Receiving step (see FIG. 3)

(1) Actuate the raw water pump 12 so that the biological treatment tank 4 will receive the waste water from a reservoir (not shown) which temporarily retains the waste water that has been treated in the stripper 3.

(2) After the lapse of a predetermined receiving time (4 to 6 hours), turn off the pump 12 to complete the reception of waste water.

The pH of the waste water influent to the tank 4 will vary with the operating conditions of stripper 3 and is typically within a range of about 8.0 to 9.0. Although pH adjustment may be eliminated, it is preferable to use HCl, $H_2SO_4$ or any other appropriate agent to adjust the pH in the tank 4 to be between 5.0 and 6.5, and more preferably between 5.0 and 6.0. This contributes to an improved efficiency of removal of COD and phenols. In this instance, the use of phosphoric acid as a pH adjusting agent has a synergistic effect, and hence is desirable because it also serves as a nutrient for the growth of microorganisms.

The biological treatment tank 4 contains both part of the waste water that has been treated in a preceding cycle and the activated sludge, so that the pH in that tank is approximately within the range of 7.0 to 8.0 if the waste water influent has a pH of about 8.0 to 9.0. Therefore, pH adjustment for the tank 4 may be achieved by one of the following two methods: in a first method, the pH of the waste water influent is adjusted such that the pH in the tank 4 will be between 5.0 and 6.5; in the other method, the pH in the tank 4 is directly adjusted by mixing waste water in the tank with a pH adjusting agent at the initial stage of the aeration step (to be described later in this specification) with the aid of the agitating force applied to achieve aeration. As a guide, in the above-mentioned first method a pH of 5.0 to 6.5 may be attained in the tank 4 by adjusting the pH of the waste water influent to a predetermined value generally of about 6.0 to 6.5. In the embodiment under discussion, a convenient method is adopted, in which an aqueous solution of 10% phosphoric acid prepared in the pH adjusting agent tank 11 is supplied with the pump 15 in a predetermined amount such that the weight concentration of phosphorous will be from 0.5 to 1 part per 100 parts of phenol; this is effective not only in enabling the pH in the tank 4 to be adjusted to between 5 and 6.5 but also in eliminating the need for a pH meter.

Figure 4:
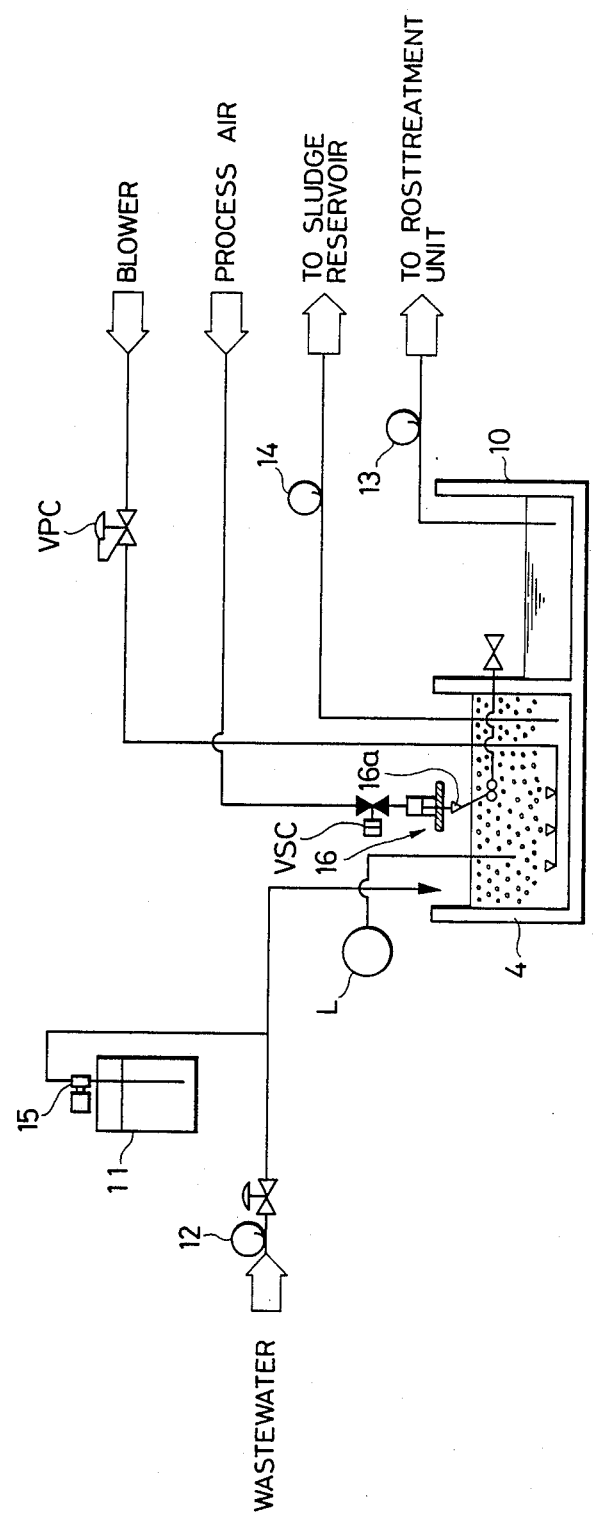
FIG. 4 is a schematic of the aeration step in a batch-operated activated sludge process.
Figure 5:
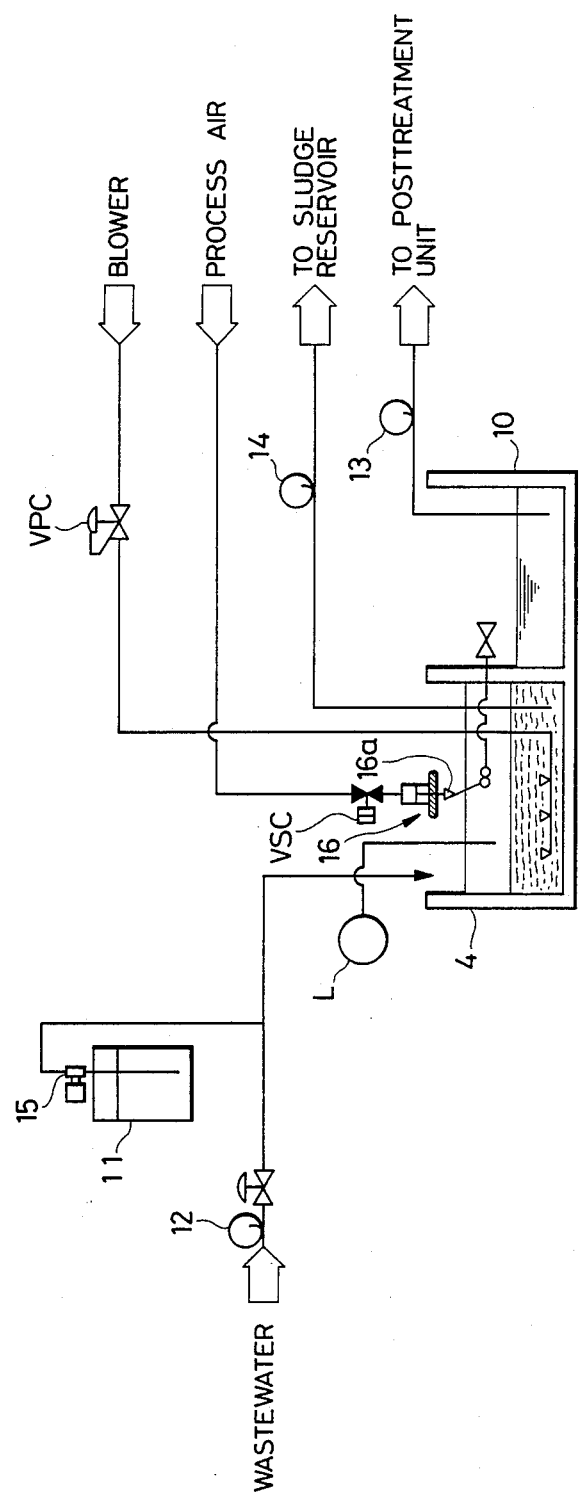
FIG. 5 is a schematic of the settling step in a batch-operated activated sludge process.

(2) Aeration step (see FIG. 4)

(1) Some time after the start of the receiving step, the blower is actuated and a flowmeter (not shown) disposed downstream of the pressure regulating valve, VPC, is adjusted such that air is supplied to the biological treatment tank 4 for effecting aeration. Aeration in this step is performed such that the conditions specified in Table 2 below can be satisfied. The duration of aeration generally ranges from 3 to 8 hours, and preferably is from 4 to 6 hours. Even if it is extended, the concentration of residual phenol reaches an equilibrium and no appreciable drop is expected. Therefore, the duration of aeration should be selected in view of the specific conditions of batch operation and on the condition that it will not exceed 8 hours per one cycle.

(2) When a predetermined time for aeration has elapsed, the blower is turned off to complete the aeration step.

TABLE 2

| Parameter | Typical range | Preferable range |
| --- | --- | --- |
| MLSS Concentration* (mg/L) | 1,000–2,500 | 1,500–2,000 |
| Dissolved oxygen** concentration (mg/L) | 0.5–6 | 0.5–4 |
| Temperature (°C.) | 10–50 | 20–30 |
| Phenol/SS loading*** (kg-phenol/kg-SS · day) | 0.08–2 | 0.1–0.3 |
| COD/SS loading**** (kg-COD/kg-SS · day) | 0.2–3.6 | 0.4–0.8 |
| pH | 5.0–6.5 | 5.5–0.6 |

*MLSS concentration: The concentration of suspended solids in a mixed liquor in the biological treatment tank
**Dissolved oxygen concentration: The amount of oxygen dissolved in water
***Phenol/SS loading: The amount of phenol in a daily charge of waste water per unit concentration of MLSS in the biological treatment tank
****COD/SS loading: The COD level in a daily charge of waste water per unit concentration of MLSS in the biological treatment tank (3) Settling step (see FIG. 5)

The purpose of this step included in the embodiment under discussion is simply to achieve separation between water and activated sludge in the biological treatment tank 4 without receiving any additional waste water or effecting aeration. The microorganisms which predominate in the course of treatment of waste water from a catalytic cracking unit 1 include pseudohypha-forming yeasts which are not common (i.e., which do not predominate) in the treatment of ordinary waste waters, and, in the presence of oils and a phenol concentration of no less than 50 ppm, the appearance of such yeasts becomes pronounced. The yeasts settle so poorly that the sludge will be carried over from the settling tank used in the conventional standard activated-sludge plant without being completely separated from the waste water. In the embodiment under discussion, the formation of pseudohyphae by these yeasts is vigorous enough to attain an SVI of the order of from 400 to 600 ml/g; at this SVI level, the sludge will be able to settle if the mixed liquor is simply allowed to stand in the tank 4. If the level of the sludge layer in the tank 4 is no higher than a predetermined discharging level, the supernatant can be discharged without being contaminated by any sludge. The discharging level is typically set to a value which is between one half and one quarter, and preferably between one half and one third, of the height from the bottom of the tank 4.

Figure 6:
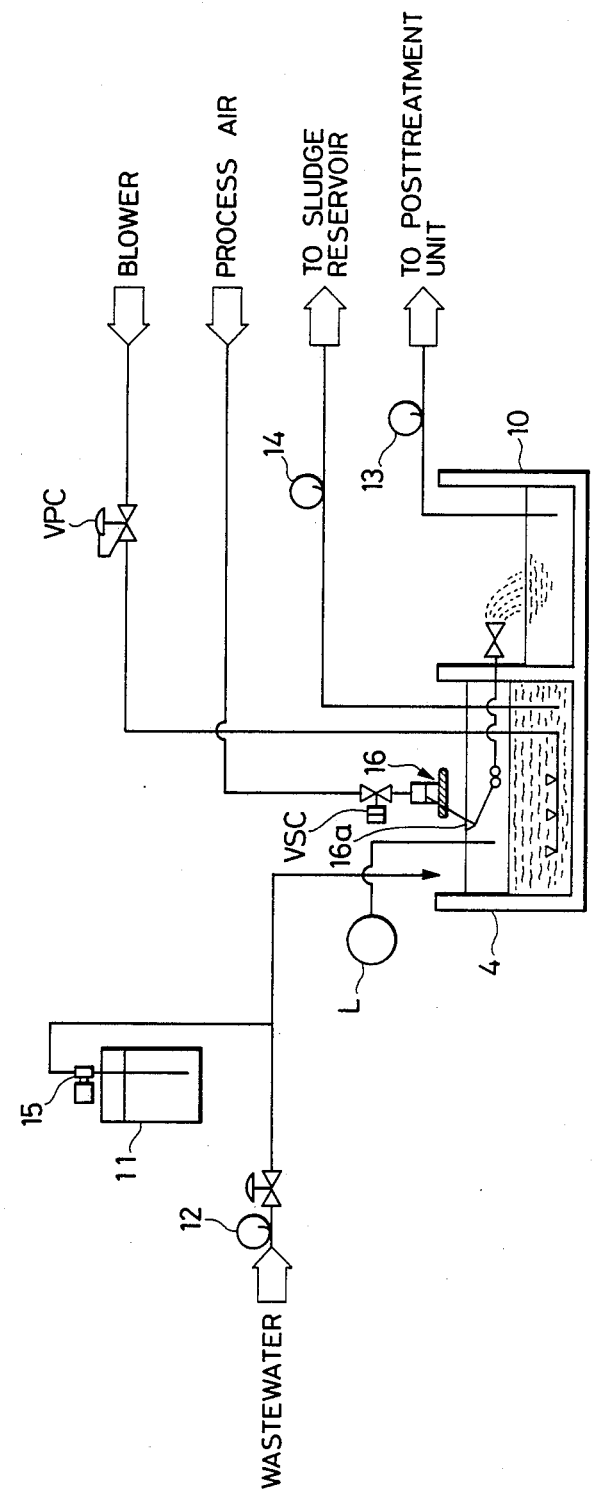
FIG. 6 is a schematic of the discharging step in a batch-operated activated sludge process.

(4) Discharging step (see FIG. 6)

(1) Close the valve, VSC, and actuate the air cylinder on the water collector 16 so as to lower the water intake port 16a deep enough to permit the supernatant from which the sludge has been separated to be discharged into the effluent tank 10.

(2) Simultaneously with the start of effluent discharging in (1), the sludge pump 14 is actuated to transfer the settled activated sludge to the sludge reservoir. In the operation of conventional continuous activated sludge plants, the amount of sludge produced is typically about 0.6 kg in terms of suspended solids (SS) per kg of BOD removed. In comparison, the increase in the concentration of MLSS is negligible in the embodiment under discussion and the amount of sludge produced is only about 0.02 to 0.08 kg of SS per kg of BOD removed even if the SS carried into the effluent (treated water) are taken into account. As a further advantage, the production of excess sludge is negligible if aeration is effected with the dissolved oxygen concentration being held at from 4 to 6 mg/L. Therefore, the method of the present invention produces an extremely small amount of excess sludge, or the need to discharge excess sludge can be entirely eliminated.

(3) When the level indicator L has detected that the level of waste water in the biological treatment tank 4 has reached the predetermined discharging level (see (3) above), the air cylinder in the water collector 16 is actuated to raise the intake port 16a above the water level and the valve VSC is closed and the water collector 16 turned off.

In order to verify the advantage of the embodiment described above, the present inventors conducted certain experiments. An experimental apparatus employed to implement the activated-sludge process as a batch system is illustrated by the flow diagram of FIG. 7; it was composed of a biological treatment tank 4a having an effective capacity of 10 l, an effluent tank 10a having an effective capacity of 5 l, a raw water tank 17 having an effective capacity of 20 l, a raw water pump 12a, an effluent pump 13a, a blower 18 for supplying air into diffuser tubes 18a, a timer 19, a first pH meter 20a, and a second pH meter 20b.

Figures 7, 8:
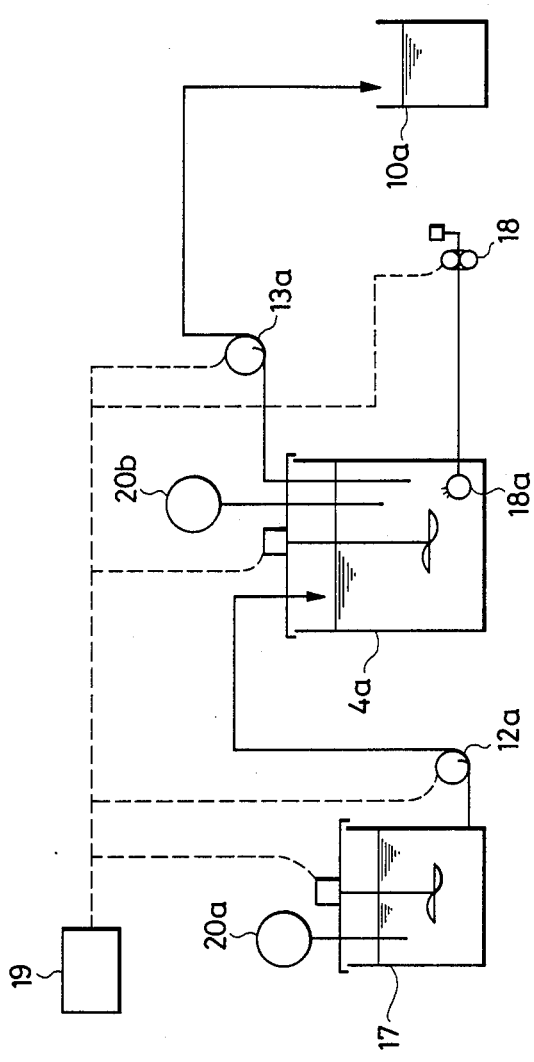
FIG. 7 is a schematic showing the flow diagram of the apparatus used in Experiments 1 to 5.
FIG. 8 illustrates a method of sludge acclimatization.

The sludge used in the experiments was acclimatized by the following procedures:

(1) excess activated sludge from a nearby sewage treatment plant was charged into the biological treatment tank 4a;

(2) the charge of sludge was adjusted such that the concentration of suspended solids in the mixed liquor in the tank 4a supplied with a planned amount of waste water would be approximately 2,000 ppm;

(3) hydrogen sulfide and ammonia in the waste water (raw water) supplied to the stripper were stripped out to lower the levels of $S^{2-}$ (hydrogen sulfide), ammonia, and oils to about 10 ppm, 60 ppm, and 10 ppm, respectively; the thus treated waste water was permitted to flow from the tank 17 into the biological treatment tank 4a, with the flow of waste water being progressively increased in accordance with the schedule shown in FIG. 8;

(4) the raw water tank 17 was supplied with an additional amount of stripped water as required to operate the tank 4a through the steps of receiving, aeration, settling, and discharging under the same conditions as would be employed in subsequent experiments; and (5) nutrient sources were added and the pH adjusted as required, with the amounts of nutrients added and the pH attained being selected such as to comply with the process conditions to be employed in subsequent experiments.

EXPERIMENT 1

With a view to demonstrating the efficiency of COD and phenol removal from the waste water from a catalytic cracking unit by performing the activated sludge process on a batch system in accordance with the present invention, raw water that had been stripped of hydrogen sulfide and ammonia in the manner described above was treated by the experimental apparatus also described above.

(1) Method

The pH of the raw water in the tank 17 that had been stripped of hydrogen sulfide and ammonia was adjusted to about 6.0 to 6.5 by addition of $H_3PO_4$ as a pH adjusting agent. The thus adjusted raw water was supplied for 6 hours at a flow rate of 13.9 ml/min into the biological treatment tank 4a in which activated sludge had been acclimatized in the manner described above. In this receiving step, the pH and MLSS concentration in the tank 4a were held at about 5 to 6.5 and 2,000 mg/L, respectively. Three hours after the start of reception of waste water, the blower 18 was actuated and air was blown into the tank 4a from below through diffuser tubes 18a so as to aerate the inside of the tank 4a and maintain the dissolved oxygen concentration at 4 to 6 mg/L. Six hours after the start of aeration, the blower 18 was turned off to commence the settling step. After the waste water was left to stand in the tank 4a for 2 hours, the effluent pump 13a was actuated and the supernatant was discharged at a flow rate of 10 L/hr into the effluent tank 10a through a PVC hose fixed in the middle portion of the tank 4a. In this discharging step, the pump 13a was operated for 30 minutes. Waste water treatment was continued for 30 days by repeating the aforementioned steps with an additional supply of stripped raw water being fed, as required, into the tank 17. According to the initial plan, any excess activated sludge that would grow during treatment was to be discharged manually from the bottom of the tank 4a simultaneously with the discharging of the supernatant. However, this was not necessary since no growth of activated sludge occurred throughout the period of experiment.

(2) Results (see Table 3)

As a result of the 30-day experiment conducted by the procedures described above, high percentages of phenol removal and COD reduction (93.9% and 77.4%, respectively) were achieved for a MLSS concentration of 2,220 mg/L, as manifested by a phenol/SS loading of 0.2 kg-phenol/kg-SS·day and a COD/SS loading of 0.45 kg-COD/kg-SS·day. The SVI attained was on the order of 500 to 600 ml/g, and, after 2 hours of settling, the sludge had reached a level sufficiently below the lower limit for the discharging of the supernatant to avoid any risk of problems occurring in the discharging of the treated water.

EXPERIMENT 2

The procedures of Experiment 1 were repeated except that a shorter period of aeration was employed.

(1) Method

The pH of the raw water in the tank 17 that had been stripped of hydrogen sulfide and ammonia was adjusted to a predetermined value by addition of $H_3PO_4$ as a pH adjusting agent. The thus adjusted raw water was supplied for 4 hours at a rate of 20.9 ml/min into the biological treatment tank 4a in which activated sludge had been acclimatized as in Experiment 1. In this receiving step, the pH and MLSS concentration in the tank 4a were held at about 5 to 6.5 and 2,000 mg/L. Three hours after the start of reception of waste water, the blower 18 was actuated and air was blown into the tank 4a from below through diffuser tubes 18a so as to aerate the inside of the tank 4a and maintain the dissolved oxygen concentration at from 4 to 6 mg/L. Four hours after the start of aeration, the blower 18 was turned off to commence the settling step. After the waste water had been left to stand in the tank 4a for 2 hours effluent pump 13a was actuated and the supernatant was discharged at a flow rate of 10 L/hr into the effluent tank 10a through a PVC hose fixed in the middle portion of the tank 4a. In this discharging step, the pump 13a was operated for 30 minutes. Waste water treatment was continued for 30 days by repeating the aforementioned steps with an additional supply of stripped raw water being fed, as required, to the tank 17. According to the initial plan, any excess activated sludge that would grow during treatment was to be extracted manually from the bottom of the tank 4a simultaneously with the discharging of the supernatant. However, this was not necessary since no growth of activated sludge occurred throughout the period of experiment.

(2) Results (see Table 3)

As a result of the 30-day experiment conducted by the procedures described above, high percentages of phenol and COD removal (93.2% and 76.7%, respectively) were achieved for a MLSS concentration of 1,880 mg/L, as manifested by a phenol/SS loading of 0.38 kg-phenol/kg-SS·day and a COD/SS loading of 0.79 kg-COD/kg-SS·day. The SVI attained was on the order of 400 to 500 ml/g and, after 2 hours of settling, the sludge had reached a level sufficiently below the lower limit for the discharging of the supernatant to avoid any risk of problems occurring in the discharging of the treated water. Furthermore, no problems occurred even when the treatment load was increased by shortening the period of aeration to two thirds of the period employed in Experiment 1.

TABLE 3

| | Experiment 1 | Experiment 2 |
|---|---|---|
| Experimental conditions | | |
| Operation cycle | 2 cycles a day | 3 cycles a day |
| Throughout (L/day) | 10 | 15 |
| MLSS concentration (mg/L) | 2,220 | 1,880 |
| Water temperature (°C.) | 22 | 22 |
| Phenol/SS loading (kg-phenol/kg-SS · day) | 0.20 | 0.38 |
| COD/SS loading (kg-COD/kg-SS · day) | 0.45 | 0.79 |
| Quality of raw water charged | | |
| pH | 6.2 | 6.4 |
| COD (mg/L) | 995 | 990 |
| Phenols (mg/L) | 448 | 472 |
| T—P (mg/L) | — | ≦0.1 |
| Quality of treated water | | |
| pH | 5.8 | 5.6 |
| COD (mg/L) | 225 | 231 |
| Phenols (mg/L) | 27 | 32 |
| Reduction | | |
| COD (%) | 77.4 | 76.7 |
| Removal | | |
| Phenol (%) | 93.9 | 93.2 |

The following methods of analysis were use in accordance with JIS K 0102:
pH: measured with a pH meter with a glass electrode;
COD: measured by the acidic $KMnO_4$ method (100° C., 30 min);
Phenols: measured by the 4-aminoantipyrine method;

EXPERIMENT 3

With a view to demonstrating the efficiency of COD and phenol removal from waste water from a catalytic cracking unit by extending the period of aeration in the activated sludge process conducted on a batch system, raw water that had been stripped of hydrogen sulfide and ammonia as in Experiment 1 was treated with the experimental apparatus also specified in connection with Experiment 1.

(1) Method

The pH of the raw water in the tank 17 that had been stripped of hydrogen sulfide and ammonia as in Experiment 1 was adjusted to a predetermined value by addition of $H_3PO_4$ as a pH adjusting agent. The thus adjusted raw water was supplied for 6 hours at a flow rate of 13.9 ml/min into the biological treatment tank 4a in which activated sludge had been acclimatized as in Experiment 1. In this receiving step, the pH and MLSS concentration in the tank 4a were held at 5.3 and 2,000 mg/L, respectively. Three hours after the start of reception of waste water, the blower 18 was actuated and air was blown into the tank 4a from below through diffuser tubes 18a so as to aerate the inside of the tank 4a and maintain the dissolved oxygen concentration at from 4 to 6 mg/L while aeration was being conducted for a period of 18 hours.

(2) Results

Figure 9:
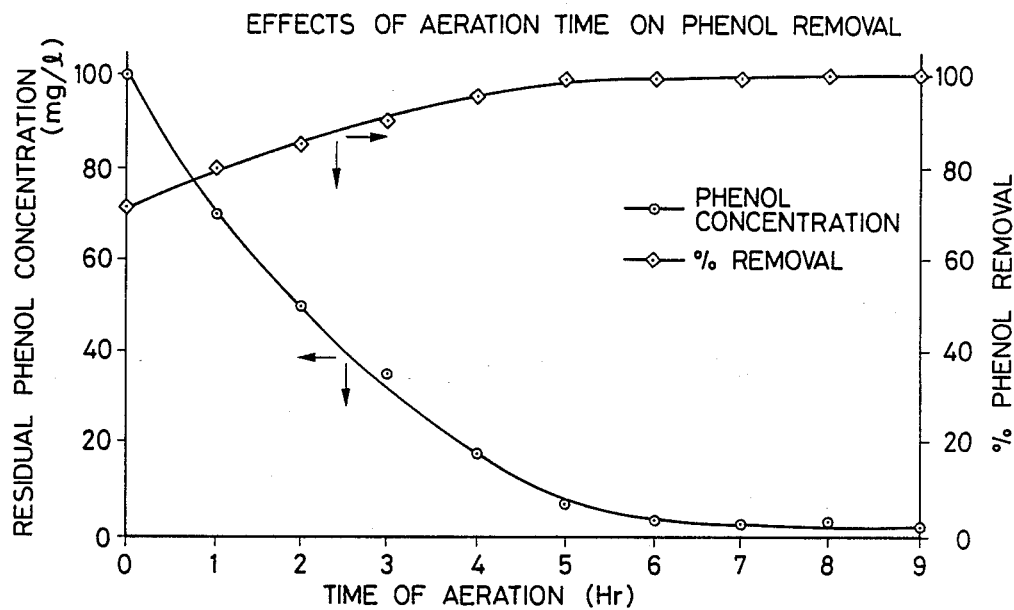
FIGS. 9 and 10 are graphs showing the results obtained in Experiment 3.
Figure 10:
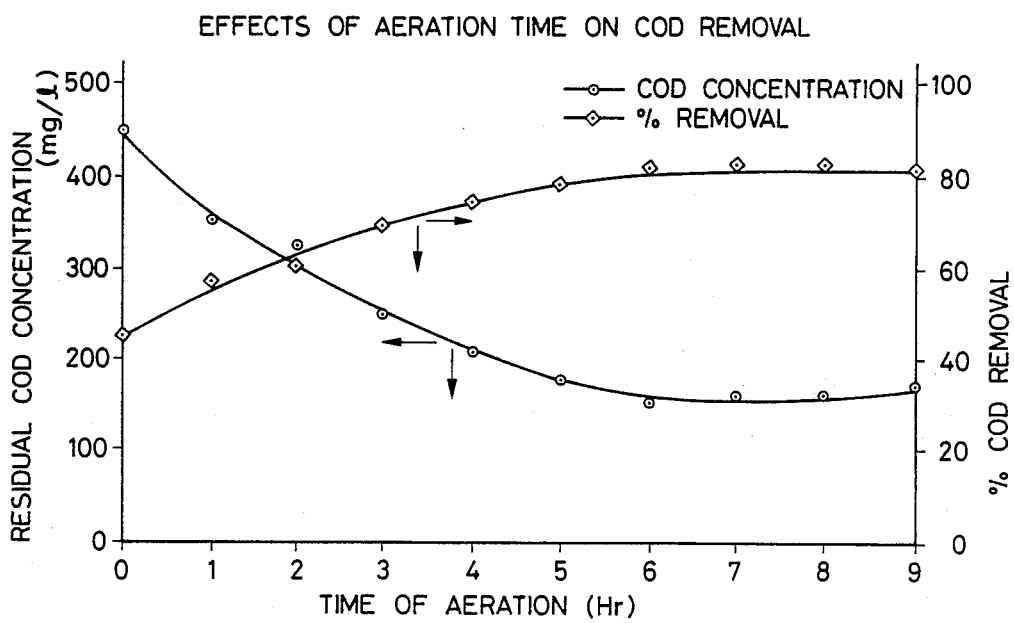

The purpose of the experiment described above was to investigate the relationship between the duration of aeration and the efficiency of removal of phenols and COD from raw water. The results are shown in Table 4 and FIGS. 9 and 10. When aeration was conducted for 6 hours, the percentage removal of phenols and the concentration of residual phenol reached 99% and 3 mg/L, respectively, and leveled off thereafter. As for the percentage of COD reduction and the residual COD value, the respective values reached about 80% and 160 mg/L between hours 5 and 6 and leveled off thereafter.

Figure 11:
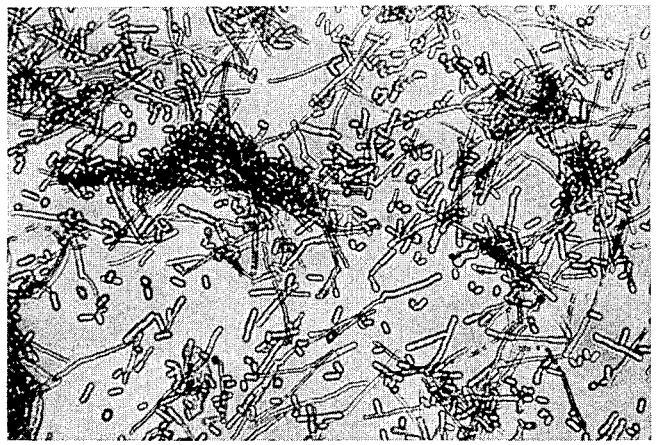
FIG. 11 is a micrograph showing yeasts producing a growth of pseudohyphae in activated sludge that was aerated for 6 hours.
Figure 12:
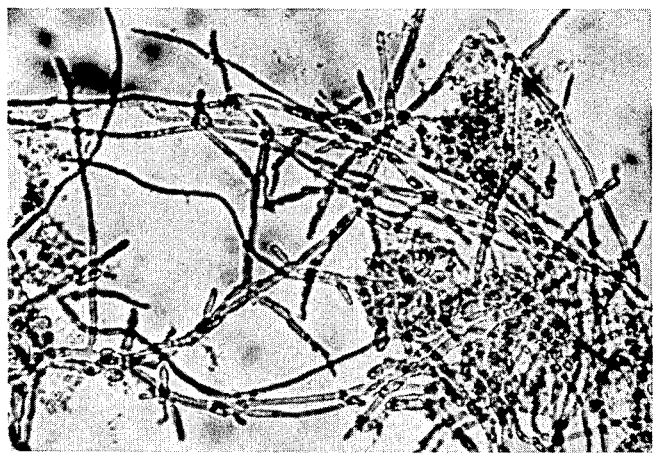
FIG. 12 is a micrograph showing yeasts that grew unicellularly and failed to produce a growth of pseudohyphae in activated sludge that was aerated for 18 hours.

The above data shows that in treating waste water from a catalytic cracking units by the activated-sludge process on a batch system, optimum efficiency is attained by performing aeration for a period of about 6 hours, typically between 3 and 8 hours, and preferably between 4 and 6 hours. As shown in the micrograph in FIG. 11, the biota in the activated sludge in tank 4a that had been aerated for 6 hours was abundant with the growth of pseudohyphae from yeasts such as *Candida humicola* and *Trichosporon penicillatum* and the formation of such pseudohyphae was marked for an aeration period of up to about 12 hours. However, when the aeration was continued for 18 hours, the formation of pseudohyphae was only occasional and was surpassed by the appearance of unicellular yeasts (see FIG. 12).

TABLE 4

| Aeration time (hr) | pH in the biological treatment tank | Phenol (initially 350 mg in 1000 ml of raw water) | | COD (initially 855 mg in 1000 ml of raw water) | |
|---|---|---|---|---|---|
| | | Concentration (mg/L) | % Removal | Value (mg/L) | % Reduction |
| 0 | 5.29 | 100 | 71.5 | 455 | 46.8 |
| 1 | 5.95 | 70 | 80 | 360 | 57.9 |
| 2 | 5.85 | 50 | 85.8 | 330 | 61.4 |
| 3 | 5.75 | 35 | 90 | 254 | 70.3 |
| 4 | 5.63 | 17.5 | 95 | 212 | 75.2 |
| 5 | 5.33 | 7 | 98 | 180 | 79 |
| 6 | 5.17 | 3 | 99.2 | 158 | 81.6 |
| 7 | 5.12 | 2.5 | 99.3 | 160 | 81.3 |
| 8 | 5.05 | 2.5 | 99.3 | 160 | 81.3 |
| 9 | 5.07 | 2 | 99.5 | 166 | 80.6 |

EXPERIMENT 4

With a view to demonstrating the effects of pH on the efficiency of COD reduction and phenol removal from raw water during treatment by the activated-sludge process on a batch system, waste water from a catalytic cracking unit was treated with the same type of apparatus as used in Experiment 1.

(1) Method

The pH of the raw water in the tank 17 that had been stripped of hydrogen sulfide and ammonia as in Experiment 1 was adjusted to 7.5 and 9.0 by addition of $H_3PO_4$ or NaOH. The thus adjusted raw water was supplied for 6 hours at a flow rate of 13.9 ml/min into the biological treatment tank 4a in which activated sludge had been acclimatized as in Experiment 1. In this receiving step, the MLSS concentration in the tank 4a was held at 2,000 mg/L. Three hours after the start of reception of waste water, the blower 18 was actuated and air was blown into the tank 4a from below through diffuser tubes 18a so as to aerate the inside of the tank 4a and maintain the dissolved oxygen concentration at from 4 to 6 mg/L. Six hours after the start of aeration, the blower 18 was turned off to commence the settling step. After the waste water was left to stand in the tank 4a for 2 hours, the effluent pump 13a was actuated and the supernatant was discharged at a flow rate of 10 L/hr into the effluent tank 10a through a PVC hose fixed in the middle portion of the tank 4a. In this discharging step, the pump 13a was operated for 30 minutes. The raw water as stripped of hydrogen sulfide and ammonia had a pH in the range of about 8.0 to 9.0. In Experiment 3, the pH of the raw water was lowered to 6.0 by addition of $H_3PO_4$ as a pH adjusting agent and treatment was conducted with the pH in the biological treatment tank 4a being rendered weakly acidic (pH, 5.3) at the start of aeration. In Experiment 4, the raw water in the tank 17 was rendered more alkaline (pH, 7.5 and 9.0) than in Experiment 3, and, accordingly, treatment was conducted with the pH in the tank 4a rendered weakly acidic (pH, 6.3) or neutral (pH, 7) at the start of aeration.

(2) Results

Figure 13:
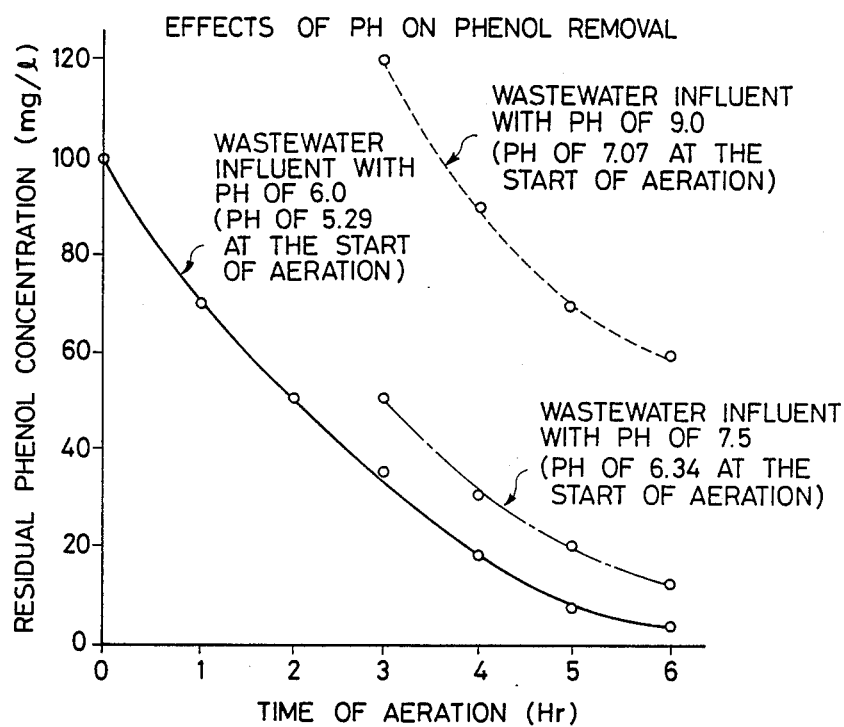
FIGS. 13 to 15 are graphs showing the results of Experiment 4.
Figure 14:
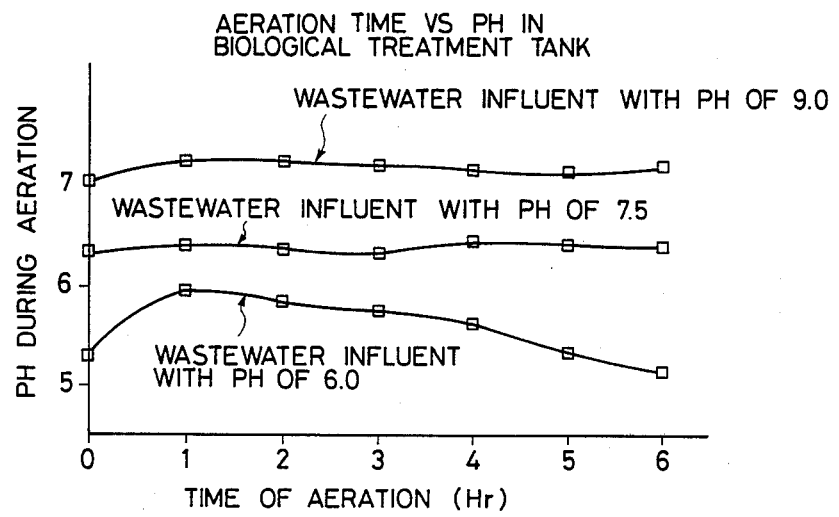
Figures 15, 17:
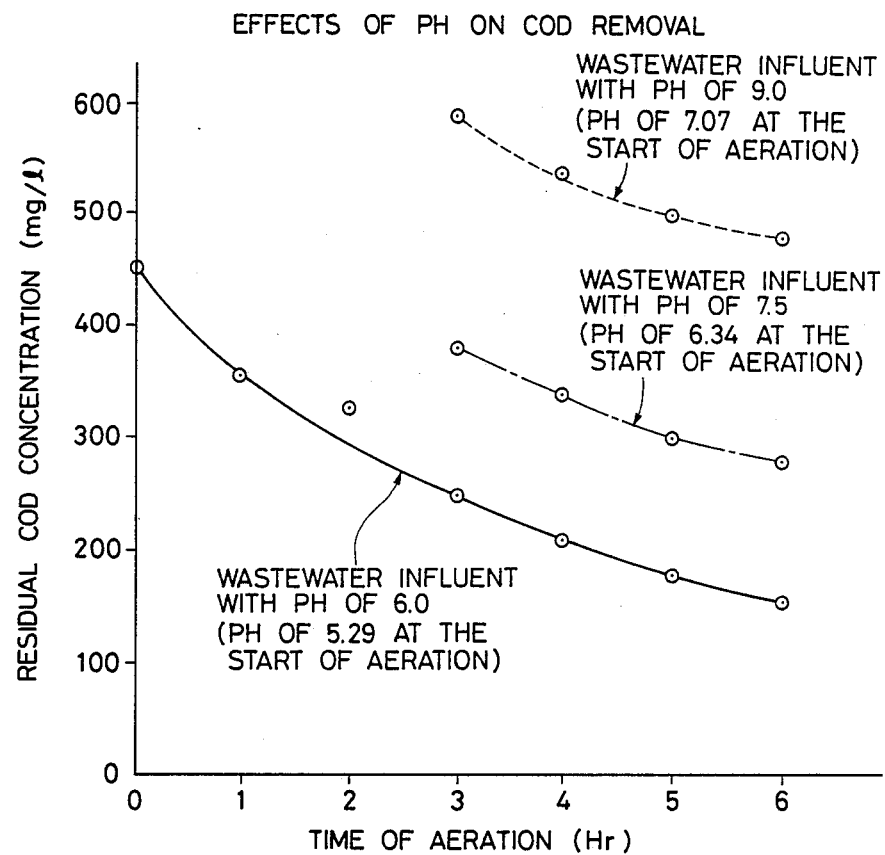
FIG. 17 illustrates another example of the schedule for operating the individual steps of the activated sludge method as a batch system.

The purpose of the experiment described above was to investigate the effects of pH on the efficiency of phenol removal and COD reduction. The results are shown in Tables 5 and 6 and FIGS. 13 to 15. Each of FIGS. 13 to 15 contains a curve with the indication of "waste water influent with pH 6.0" (pH of 5.29 at the start of aeration in tank 4a) and this curve shows the results of Experiment 3. As FIGS. 13 to 15 show, when raw water having a pH of 9.0 (corresponding to a pH of 7.07 at the time of start of aeration in tank 4a) was treated with the pH in the tank 4a being rendered neutral, the percentages of phenol removal and COD reduction attained after 6 hours of aeration were 82.9% and 56.4%, respectively; these values were much lower than those attained in Experiment 3 by treating weakly acidic (pH, 6.0) waste water (corresponding to a pH of 5.29 at the start of aeration in tank 4a) and in Experiment 4 by treating neutral (pH 7.5) waste water (corresponding to a pH of 6.34 at the start of aeration in tank 4a). It was formerly reported that phenolic waste waters could be effectively treated by performing the continuous activated-sludge process under alkaline conditions, but the above results show that acidic conditions (pH 5.0–6.5) are favorable for the purpose of treating waste water from a catalytic cracking unit.

TABLE 5

| Aeration time (hr) | pH in the biological treatment tank | Phenol (initially 350 mg in 1000 ml of raw water) | | COD (initially 1000 mg in 1000 ml of raw water) | |
|---|---|---|---|---|---|
| | | Concentration (mg/L) | % Removal | Value (mg/L) | % Reduction |
| 0 | 6.34 | — | — | — | — |
| 1 | 6.40 | — | — | — | — |
| 2 | 6.38 | — | — | — | — |
| 3 | 6.34 | 50 | 85.8 | 380 | 62 |
| 4 | 6.46 | 30 | 91.5 | 340 | 62 |
| 5 | 6.43 | 20 | 94.3 | 300 | 70 |
| 6 | 6.42 | 12 | 96.6 | 280 | 72 |

These values are experimentally obtained in controlling pH of inflow raw water at 7.5

TABLE 6

| Aeration time (hr) | pH in the biological treatment tank | Phenol (initially 350 mg in 1000 ml of raw water) | | COD (initially 1100 mg in 1000 ml of raw water) | |
|---|---|---|---|---|---|
| | | Concentration (mg/L) | % Removal | Value (mg/L) | % Reduction |
| 0 | 7.07 | — | — | — | — |
| 1 | 7.27 | — | — | — | — |
| 2 | 7.27 | — | — | — | — |
| 3 | 7.24 | 120 | 65.9 | 590 | 46.4 |
| 4 | 7.21 | 90 | 74.3 | 540 | 50.9 |
| 5 | 7.18 | 70 | 80 | 500 | 54.6 |
| 6 | 7.23 | 60 | 82.9 | 480 | 56.4 |

These values are experimentally obtained in controlling pH of inflow raw water at 9.0.

EXPERIMENT 5

With a view to demonstrating the advantages of performing the activated sludge process on a batch system with aeration being effected intermittently, raw water that had been tripped of hydrogen sulfide and ammonia as in Experiment 1 was treated by the activated sludge process both batchwise and continuously, and the concentration of suspended solids (SS) in the water treated by each method was measured.

(1) Methods

Figure 16:
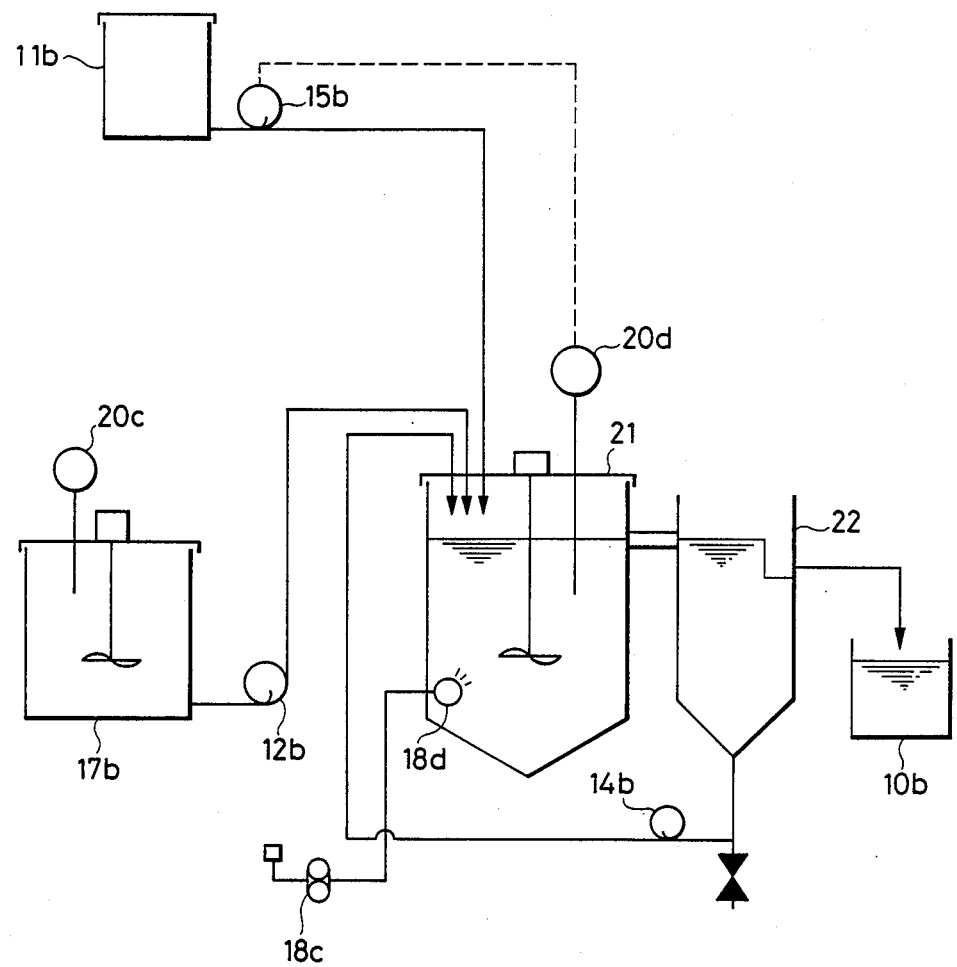
FIG. 16 is a schematic showing the components of an apparatus used in an experiment for performing the activated sludge method in a continuous fashion.

The activated sludge process on a batch system was performed as in Experiment 1. An apparatus for implementing the activated sludge process continuously had the flow diagram shown in FIG. 16 and was composed of: a raw water tank 17b having an effective capacity of 20 l, an aeration tank 21 having an effective capacity of 10 l, a settling tank 22 having an effective capacity of 2 l, an effluent tank 10b having an effective capacity of 5 l, a pH adjusting agent tank 11b, a raw water pump 12b, a sludge return pump 14b, a pump 15b for supplying a metered amount of pH adjusting agent, a blower 18c for supplying air to diffuser tubes 18d, a first pH meter in the raw water tank 17b, and a second pH meter 20d that measures the pH in the aeration tank 21 for controlling the pump 15b.

The continuous activated sludge process was performed by the following procedures. First, activated sludge that had been acclimatized with raw water stripped as in Experiment 1 was charged into the aeration tank 21 so as to adjust the MLSS concentration in the tank 21 to 2,000 mg/L. Raw water was supplied to the tank 21 at a flow rate of 0.42 L/hr. The tank 21 was supplied with $H_3PO_4$ as a pH adjusting agent to keep the pH in the tank 21 between 5.0 and 6.5 while, at the same time, air was supplied to maintain the dissolved oxygen concentration at between 2 and 4 mg/L. The raw water was retained within the tank 21 for 12 hours, during which period the COD was reduced and phenols were removed from the waste water by biological oxidation with the activated sludge, and the mixture of the water and the activated sludge were then allowed to flow into the settling tank 22, which was operated at a surface water loading of 1.3 $m^3/m^2$·day. After solid-liquid separation had been achieved in the tank 22, the supernatant was permitted to flow into the effluent tank 10b while part of the separated sludge was extracted as excess sludge from the bottom of the tank 22. The remaining sludge was returned to the aeration tank 21 with the sludge pump 14b. The ratio of returned sludge to the supply of raw water was 1/1.

(2) Results

The SS concentration in the effluent was 20 to 30 ppm for treatment on a batch system, and 100 to 150 ppm for continuous treatment. In the continuous treatment, the MLSS concentration in the aeration tank 21 dropped to about 500 mg/L in about one week from the start of operation, and because of this marked decrease in the efficiency of treatment, the experiment had to be suspended. Microscopic observation showed that the sludge used in the batch operation contained a growth of pseudohyphae from pseudohypha-forming yeasts whereas the growth form of coexisting yeasts in the sludge used in the continuous operation was unicellular, which rendered the sludge very poorly settleable.

As an alternative to the method of stripping used in the embodiment described above, the stripper 3 may be divided into two separate towers, one for stripping out hydrogen sulfide, and the other for stripping out ammonia, so that hydrogen sulfide and ammonia may be recovered separately from above the two towers. If desired, waste water from which ammonia and hydrogen sulfide have been removed in stripper 3 may be fed into the biological treatment tank 4 after removing phenol by a phenol extracting unit or by a crude oil desalting unit. In this case, the waste water leaving either extracting unit contains a large volume of emulsion such as crude oil which may cause adverse effects on the activated sludge if the waste water is directly received at the biological treatment tank 4. In order to avoid this problem, the waste water emerging from the extracting unit is desirably passed through a coalescent oil-water separator or any other suitable device to reduce the oil content to about 40 to 50 ppm.

In the embodiment the aeration step was started after the receiving step had already progressed to some extent. Instead, the aeration step may be started only after the receiving step has been completed, or as shown in FIG. 17, the two steps may be started at the same time. If desired, the receiving step for permitting waste water into the biological treatment tank 4 may be effected in each of the aeration, settling and discharging steps. If this system is adopted, a baffle having an opening in the lower portion must be provided in the vicinity of the inlet for waste water feed to the tank 4 and, the tank 4 must be in the form of a rectangular prism so as to prevent shortcircuiting of the incoming waste water. However, this system has the advantage that there is no need to provide a reservoir ahead of the biological treatment tank 4. Needless to say, a virtually continuous treatment system without any reservoir for waste water influent may be designed by permitting successive inflow of waste water into a plurality of parallel-arranged biological treatment tanks 4.

The progress of waste water in the biological treatment tank 4 through charging, aeration, settling, and discharging steps may be controlled with the aid of a suitable timing device (e.g., a timer or a sequencer) such that the number of cycles performed each day can be set at 1, 2, 3, or 4. An anaerobic step (i.e., wherein the mixed liquor in the biological treatment tank is agitated for achieving denitrification without supplying oxygen) may be provided both before and after the aeration step.

In the embodiment, waste water from the stripper 3 was not diluted before it was permitted to flow into the biological treatment tank 4. It should of course be understood that the waste water may be diluted with other process waste waters or industrial waters before it is fed to the tank 4.

As described in the foregoing pages, in accordance with the method of the present invention for treating waste water from a catalytic cracking unit, waste water that has been stripped of hydrogen sulfide and ammonia is permitted to flow into a batch-operated biological treatment tank and aeration as a step in activated sludge treatment is effected intermittently with the total duration of the aeration performed daily not exceeding 12 hours. Even if the stripped waste water is permitted directly (i.e., undiluted) into the biological treatment tank, pseudohypha-forming yeasts will grow in a sufficient amount to ensure high percentages of phenol removal and COD reduction, and thereby achieve very satisfactory treatment of waste water. This eliminates not only the need to use a flocculant for the purpose of preventing sludge bulking, but also the necessity for exercising utmost care in controlling the operation of the treatment system. As a further advantage, the method of the present invention produces so small an amount of sludge that it provides great ease in the handling of excess sludge.

What is claimed is:

1. A method for treating waste water from a catalytic petroleum cracking unit, comprising:
   a receiving step for supplying waste water from which hydrogensulfide and ammonia have been stripped out into a biological treatment tank, said biological treatment tank having therein activated sludge which is acclimated with the waste water so that pesuedohypha-forming yeasts predominate;
   an aeration step for aerating the waste water in the biological treatment tank for a period of time in a range from 3 to 12 hours;
   a settling step for settling the activated sludge in the biological treatment tank for a predetermined period of time and
   a discharging step for allowing supernatant to be discharged from the biolgocial treatment tank;
   wherein the total duration of the aeration performed daily is not longer than 12 hours.

2. A method of claim 1, wherein the pseudohypha-forming yeasts include at least one of *Candida humicola* and *Trichosporon penicillatum*.

3. A method according to claim 1, wherein the concentration of the ammonium iron in the waste water supplied into the biological treatment tank is not more than 150 ppm.

4. A method according to claim 3, wherein the phenol concentration of the waste water supplied to the biological treatment tank is not lower than 50 ppm.

5. A method according to claim 3, wherein the sulfide ion concentration of the waste water supplied into the biological treatment tank is not more than 10 ppm.

6. A method according to claim 1, wherein the duration of the aeration step for one cycle is not shorter than 3 hours and not more than 8 hours.

7. A method according to claim 6, wherein the duration of the aeration step for one cycle is not shorter than 4 hours and not more than 6 hours.

8. A method according to claim 1, wherein said aeration step is performed either after the pH in the biological treatment tank has been adjusted to 5.0 to 6.5 or with the ph in the biological treatment tank being adjusted to 5.0 to 6.5 during the initial period of said aeration step.

9. A method according to claim 8, wherein phosphoric acid is used as a pH adjusting agent.

10. A method according to claim 8, wherein said aeration step is performed either after the pH in the biological treatment tank has been adjusted to 5.0 to 6.0 or with the pH in the biological treatment tank being adjusted to 5.0 to 6.0 during the initial period of said aeration step.

11. A method according to claim 10, wherein phosphoric acid is used as a pH adjusting agent.

12. A method according to claim 1, wherein said aeration step is perfomred with a dissolved oxygen concentration being in a range of from 0.5 to mg/L.

13. A method according to claim 12, wherein said aeration step is performed with the dissolved oxygen concentration being in a range of from 4 to 6 mg/L.

14. A method according to claim 1, wherein said aeration step is performed under the following conditions; A MLSS concentration of 1,000 to 2,500 mg/L; a phenol/SS loading of 0.08 to 2 kg-phenol/kg-SS day; a COD/SS loading of 0.2 to 3.6 kg-COD/kg-SS day; and a temperature of 10° to 50° C.

15. A method according to claim 14, wherein said aeration step is performed under the following conditions; a MLSS concentration of 1,500 to 2,000 mg/L; a phenol/SS loading of 0.1 to 0.3 kg-phenol/kg-SS day; a COD/SS loading of 0.4 to 0.8 kg-COD/kg-SS day; and a temperature of 20° to 30° C.

16. A method for treating waste water from a catalytic petroleum cracking unit, comprising:
   as receiving step for supplying waste water from which hydrogen sulfide and ammonia have been stripped out into a biological treatment tank, said biological treatment tank having therein activated sludge which is acclimated with the waste water so that pseudohypha-forming yeasts grow actively enough to facilitate settling and separation of activated sludge;
   an aeration step for aerating the waste water in the biological treatment tank for a predetermined period of time;
   an anaerobic step wherein the waste water is agitated without aeration in the biolgocal treatment tank for a predetermined time period;
   a settling step for settling the activated sludge in the biological treatment tank for a predetermined period of time; and
   a discharging step allowing supernatant to be discharged from the biological treatment tank;
   wherein the total duration of the aeration performed daily is not longer than 12 hours.

17. A method according to claim 16, wherein said anaerobic step is conducted before said aeration step.

18. A method according to claim 16, wherein said anaerobic step is conducted after said aeration step.

19. A method according to claim 16, wherein said anaerobic step is conducted during said aeration step.

20. A method according to claim 16, wherein said aeration step is performed either after the pH in the biological treatment tank has been adjusted to 5.0 to 6.5 or with the pH in the biological treatment tank being adjusted to 5.0 to 6.5 during the initial period of said aeration step.

21. A method according to claim 20, wherein phosphoric acid is used as a pH adjusting agent.

22. A method according to claim 20, wherein said aeration step is performed either after the pH in the biological treatment tank has been adjusted to 5.0 to 6.0 or with the pH in the biological treatment tank being adjusted to 5.0 to 6.0 during the initial period of said aeration step.

23. A method according to claim 22, wherein phosphoric acid is used as a pH adjusting agent.

24. A method according to claim 16, wherein the concentration of the ammonium ion in the waste water supplied into the biological treatment tank is not more than 150 ppm.

25. A method according to claim 24, wherein the phenol concentration of the waste water supplied to the biological treatment tank is not lower than 50 ppm.

26. A method according to claim 24, wherein the sulfide ion concentration of the waste water supplied into the biological treatment tank is not more than 10 ppm.

27. A method according to claim 26, wherein said aeration step is performed with a dissolved oxygen concentration being in a range of form 0.5 to 6 mg/L.

28. A method according to claim 27, wherein said aeration step is performed with the dissolved oxygen concentration being in a range of form 4 to 6 mg/L.

29. A method according to claim 16, wherein said aeration step is performed under the following conditions: a MLSS concentration of 1,000 to 2,500 mg/L; a phenol/SS loading of 0.08 to 2 kg-phenol/kg-SS day; a COD/SS loading of 0.2 to 3.6 kg-COD/kg-SS day; and a temperature of 10° to 50° C.

30. A method according to claim 29, wherein said aeration step is performed under the following conditions; a MLSS concentration of 1,500 to 2,000 mg/L; a phenol/SS loading of 0.1 to 0.3 kg-phenol/kg-SS day; a COD/SS loading of 0.4 to 0.8 kg-COD/kg-SS day; and a temperature of 20° to 30° C.

* * * * *